United States Patent
Omae et al.

(10) Patent No.: US 11,545,657 B2
(45) Date of Patent: Jan. 3, 2023

(54) CATHODE ACTIVE MATERIAL INCLUDING LITHIUM COMPOSITE OXIDE HAVING A LAYERED CRYSTAL STRUCTURE

(71) Applicant: Panasonic Intellectual Property Management Co., Ltd., Osaka (JP)

(72) Inventors: Takanori Omae, Osaka (JP); Ryuichi Natsui, Osaka (JP); Yu Otsuka, Osaka (JP); Shuhei Uchida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 16/820,643

(22) Filed: Mar. 16, 2020

(65) Prior Publication Data

US 2020/0388823 A1 Dec. 10, 2020

(30) Foreign Application Priority Data

Jun. 5, 2019 (JP) ............................. JP2019-105515

(51) Int. Cl.
*H01M 4/131* (2010.01)
*H01M 4/505* (2010.01)
*H01M 10/0562* (2010.01)
*H01M 10/052* (2010.01)
*H01M 4/525* (2010.01)
*H01M 4/36* (2006.01)

(52) U.S. Cl.
CPC ............ *H01M 4/131* (2013.01); *H01M 4/505* (2013.01); *H01M 4/525* (2013.01); *H01M 10/052* (2013.01); *H01M 10/0562* (2013.01); *H01M 4/366* (2013.01)

(58) Field of Classification Search
CPC ...... H01M 4/131; H01M 4/505; H01M 4/525; H01M 10/052; H01M 10/0562; H01M 4/366; H01M 10/0565; H01M 10/0566; H01M 4/1315; H01M 10/0525; H01M 2004/021; H01M 2004/028; H01M 4/485; Y02E 60/10
See application file for complete search history.

(56) References Cited

U.S. PATENT DOCUMENTS

| | | | |
|---|---|---|---|
| 2016/0056462 A1* | 2/2016 | Sakai | H01M 4/525 429/223 |
| 2018/0048015 A1 | 2/2018 | Lee et al. | |
| 2019/0221838 A1* | 7/2019 | Ishikawa | H01M 4/525 |
| 2020/0020943 A1* | 1/2020 | Natsui | H01M 10/052 |

FOREIGN PATENT DOCUMENTS

| | | | | |
|---|---|---|---|---|
| JP | 2018-521456 | | 8/2018 | |
| WO | WO 2018/163519 | * | 9/2018 | ............ H01M 4/505 |

* cited by examiner

*Primary Examiner* — Kwang Han
(74) *Attorney, Agent, or Firm* — McDermott Will & Emery LLP (57) ABSTRACT

A cathode active material includes a lithium composite oxide having a crystal structure which belongs to a layered structure. The lithium composite oxide has a BET specific surface area of not less than 5 m²/g and not more than 10 m²/g. The lithium composite oxide has an average particle size of not less than 3 μm and not more than 30 μm. The lithium composite oxide, an average crystallite size calculated by an X-ray diffraction method is not less than 150 Å and not more than 350 Å.

17 Claims, 2 Drawing Sheets

CATHODE ACTIVE MATERIAL INCLUDING LITHIUM COMPOSITE OXIDE HAVING A LAYERED CRYSTAL STRUCTURE

BACKGROUND

1. Technical Field

The present disclosure relates to a cathode active material and a battery using the same.

2. Description of the Related Art

Patent Literature 1 discloses a cathode active material for a secondary battery. The cathode active material includes a core; a shell surrounding the core; and a buffer layer including a three-dimensional network structure connecting the core and the shell and a void located between the core and the shell. The three-dimensional network structure in the core, the shell, and the buffer layer each independently includes a polycrystalline lithium composite metal oxide represented by a chemical formula $Li_aNi_{1-x-y}Co_xM1_yM3_zM2_wO_2$, which includes a plurality of crystal grains. The crystal grains have an average crystal size of 50 nm to 150 nm. Here, in Patent Literature 1, in the above chemical formula, M1 includes any one or more elements selected from the group consisting of Al and Mn. M2 includes one or more elements selected from the group consisting of Zr, Ti, Mg, Ta and Nb. M3 includes any one or more elements selected from the group consisting of W, Mo, and Cr. The values of a, x, y, z, and w satisfy $1.0 \leq a \leq 1.5$, $0 < x \leq 0.5$, $0 < y \leq 0.5$, $0.0005 \leq z \leq 0.03$, $0 \leq w \leq 0.02$, and $0 < x+y \leq 0.7$.

CITATION LIST

Patent Literature

Patent Literature 1: Japanese Patent Application Publication No. 2018-521456

SUMMARY

In the prior art, realization of a high-capacity battery is desired.

The cathode active material in one aspect of the present disclosure comprises a lithium composite oxide having a crystal structure which belongs to a layered structure,
wherein
the lithium composite oxide has a BET specific surface area of not less than 5 m²/g and not more than 10 m²/g;
the lithium composite oxide has an average particle size of not less than 3 µm and not more than 30 µm; and
in the lithium composite oxide, an average crystallite size calculated by an X-ray diffraction method is not less than 150 Å and not more than 350 Å.

The general or specific aspects of the present disclosure may be realized by a cathode active material for a battery, a battery, a method, or any combination thereof.

According to the present disclosure, a high-capacity battery can be realized.

DETAILED DESCRIPTION OF THE EMBODIMENT

Hereinafter, embodiments of the present disclosure will be described.

First Embodiment

The cathode active material according to the first embodiment comprises a lithium composite oxide having a crystal structure which belongs to a layered structure. The lithium composite oxide has a BET specific surface area of not less than 5 m²/g and not more than 10 m²/g. The lithium composite oxide has an average particle size of not less than 3 µm and not more than 30 µm. In the lithium composite oxide, an average crystallite size calculated by an X-ray diffraction method is not less than 150 Å and not more than 350 Å.

According to the above configuration, a high-capacity battery can be realized.

The cathode active material according to the first embodiment is, for example, a cathode active material for a lithium ion battery. For example, in a case a lithium ion battery is configured using the cathode active material according to the first embodiment, the lithium ion battery has a redox potential of approximately 3.4 V (Li/Li⁺ reference). In addition, the lithium ion battery has a capacity of approximately not less than 260 mAh/g.

The crystal structure which belongs to the layered structure is, for example, a hexagonal crystal structure or a monoclinic crystal structure. In addition, specifically, the crystal structure which belongs to the layered structure may be a crystal structure which belongs to at least one of a space group C2/m and a space group R-3m.

In the cathode active material according to the first embodiment, the lithium composite oxide may include a first phase having a crystal structure which belongs to the space group C2/m and a second phase having a crystal structure which belongs to the space group R-3m.

The crystal structure which belongs to the space group C2/m has a structure in which Li layers and transition metal layers (i.e., layers occupied by "cationic elements such as transition metals") are alternately stacked. In addition, the transition metal layers may include Li in addition to the "cationic element such as transition metals". Therefore, the crystal structure which belongs to the space group C2/m can occlude a larger amount of Li in the crystal structure than LiCoO₂, which is a general conventional material.

However, in the case of only the crystal structure which belongs to the space group C2/m, it is conceivable that the capacity is decreased during quick charge since a migration barrier of Li in the transition metal layers is high (namely, diffusivity is low).

On the other hand, the crystal structure which belongs to the space group R-3m has a high Li diffusivity since a Li diffusion path is present two-dimensionally.

The lithium composite oxide included in the cathode active material according to the first embodiment may include a phase having a crystal structure which belongs to both of the above space groups. It is conceivable that, in the case where the lithium composite oxide included in the cathode active material according to the first embodiment includes both a crystal structure which belongs to the space group C2/m and a crystal structure which belongs to the space group R-3m, the cathode active material according to the first embodiment realizes a high-capacity battery and a battery suitable for the quick charge.

In addition, in the lithium composite oxide included in the cathode active material according to the first embodiment, a plurality of regions each consisting of the first phase and a plurality of regions each consisting of the second phase may be randomly disposed three-dimensionally.

According to the configuration described above, the three-dimensional diffusion path of Li is expanded, so that a larger amount of Li can be inserted and desorbed, and a higher capacity battery can be realized.

In the cathode active material according to the first embodiment, the lithium composite oxide may be a multi-phase mixture, as described above. For example, a layer structure consisting of a single-phase bulk layer and a single-phase coat layer that covers the single-phase bulk layer is different from the multi-phase mixture in the present disclosure. In addition, the multi-phase mixture means a substance including a plurality of phases, and does not limit to mixing of a plurality of materials which correspond to those phases during production.

The fact that the lithium composite oxide is a multi-phase mixture can be identified by an X-ray diffraction (i.e., XRD) measurement or an electron diffraction measurement. Specifically, if a spectrum provided for a certain lithium composite oxide includes peaks indicating a characteristic of a plurality of phases, the lithium composite oxide is determined to be a multi-phase mixture.

The integrated intensity of each diffraction peak can be calculated using, for example, a software attached to an XRD apparatus (for example, PDXL attached to a powder X-ray diffractometer manufactured by Rigaku Corporation). In this case, the integrated intensity of each diffraction peak can be provided, for example, by calculating the area from the height and the half width of each diffraction peak.

In general, in an XRD pattern using a CuKα ray, in the case of the crystal structure which belongs to the space group C2/m, the maximum peak which is present within a range where the diffraction angle 2θ is not less than 18° and not more than 20° reflects a (001) plane. In addition, the maximum peak which is present within a range where the diffraction angle 2θ is not less than 20° and not more than 23° reflects a (020) plane.

In addition, generally, in the XRD pattern using a CuKα ray, in the case of the crystal structure which belongs to the space group R-3m, the maximum peak which is present within a range where the diffraction angle 2θ is not less than 18° and not more than 20° reflects a (003) plane. No diffraction peaks are present within a range where the diffraction angle 2θ is not less than 20° and not more than 23°

In the case where the lithium composite oxide in the first embodiment includes a first phase having a crystal structure which belongs to the space group C2/m, and a second phase having a crystal structure which belongs to the space group R3-m, it is not always easy to completely identify the space group reflected by the maximum peak which is present within the range where the diffraction angle 2θ is not less than 18° and not more than 20°.

In that case, in addition to the X-ray diffraction measurement described above, an electron diffraction measurement using a transmission electron microscope (i.e., TEM) can be performed. By observing the electron diffraction pattern by a known method, it is possible to identify a space group included in the lithium composite oxide in the cathode active material according to the first embodiment. Thereby, a skilled person can confirm that the lithium composite oxide has a first phase having a crystal structure which belongs to the space group C2/m and a second phase having a crystal structure which belongs to the space group R-3m in the cathode active material according to the first embodiment.

The lithium composite oxide in the first embodiment may be a two-phase mixture of the first phase and the second phase.

In the cathode active material according to the first embodiment, in the XRD pattern of the lithium composite oxide, an integrated intensity ratio $I_{(20°-23°)}/I_{(18°-20°)}$ of a second maximum peak which is present within the range where the diffraction angle 2θ is not less than 20° and not more than 23° to a first maximum peak which is present within the range where the diffraction angle 2θ is not less than 18° and not more than 20° may satisfy $0.05 \leq I_{(20°-23°)}/I_{(18°-20°)} \leq 0.26$.

Here, $I_{(20°-23°)}/I_{(18°-20°)}$ is a parameter that can be an index of the proportion of the first phase and the second phase in the lithium composite oxide. It is conceivable that $I_{(20°-23°)}/I_{(18°-20°)}$ is greater, as the presence proportion of the first phase increases. In addition, it is conceivable that $I_{(20°-23°)}/I_{(18°-20°)}$ is lower as the presence proportion of the second phase increases.

It is conceivable that, if $I_{(20°-23°)}/I_{(18°-20°)}$ is not less than 0.05, the presence proportion of the first phase is increased, so that the amount of Li inserted and desorbed during the charge and the discharge will increase. Therefore, high capacity can be realized.

It is conceivable that, if $I_{(20°-23°)}/I_{(18°-20°)}$ is not more than 0.26, the presence proportion of the second phase is increased, so that the diffusion of Li is improved. Therefore, high capacity can be realized.

It is conceivable that, as described above, in the cathode active material according to the first embodiment, if the lithium composite oxide satisfies $0.05 \leq I_{(20°-23°)}/I_{(18°-20°)} \leq 0.26$, a large amount of Li is allowed to be inserted and desorbed, and the diffusion of Li is improved. Therefore, it is conceivable that the lithium composite oxide in the first embodiment can realize a high-capacity battery.

As described above, the lithium composite oxide included in the cathode active material according to the first embodiment may include at least one selected from the group consisting of F, Cl, N, and S.

According to the above configuration, it is conceivable that the crystal structure is stabilized by substituting a part of oxygen with an electrochemically inactive anion. In addition, it is conceivable that by substituting a part of oxygen with an anion having a large ionic radius, the crystal lattice is expanded and the diffusivity of Li is improved. In addition, it is conceivable that the crystal structure is further stabilized in the crystal having the first phase and the second phase as described above. For this reason, it is conceivable that a larger amount of Li can be inserted and desorbed. Therefore, a high-capacity battery can be realized.

In addition, in the cathode active material of the first embodiment, the lithium composite oxide includes at least one element selected from the group consisting of F, Cl, N, and S, so that the redox amount of oxygen is prevented from being too large. For this reason, it is conceivable that a capacity or a cycle characteristic is improved since the crystal structure is prevented from being unstable due to oxygen desorption.

In addition, in the cathode active material according to the first embodiment, the lithium composite oxide may include F.

According to the above configuration, by replacing a part of oxygen with F, which has a high electronegativity, a cation-anion interaction is enhanced, and the discharge capacity or operating voltage of the battery is improved. In addition, by dissolving F, which has a high electronegativity, electrons are localized as compared with the case where F is not included. Therefore, oxygen desorption during the charge can be suppressed, and the crystal structure is stabilized. In addition, the crystal structure is further stabilized in the crystal having the first phase and the second phase as described above. For this reason, it is conceivable that a larger amount of Li can be inserted and desorbed. It is conceivable that a higher capacity battery can be realized by these effects acting comprehensively.

In the cathode active material according to the first embodiment, the average particle size of the lithium composite oxide is within a range of not less than 3 μm and not more than 30 μm. If a battery is produced using the lithium composite oxide as a cathode active material, an increase in a density of the cathode active material is one means for increasing the capacity of the battery. It is conceivable that, in the cathode active material according to the first embodiment, since the lithium composite oxide having a large particle size and the average particle size within the above-described range is used as a cathode active material, the density of the cathode active material is increased. In this way, the increase in the capacity would be realized.

The average particle size of the lithium composite oxide in the cathode active material of the present disclosure can be determined by measuring the particle size of 100 lithium composite oxide particles using a scanning electron microscope (i.e., SEM) image, and then, calculating an average value using the measured particle size.

As described above, if the lithium composite oxide has a large particle size, the density of the cathode active material is increased, and the increase in the capacity is realized. However, in case where the lithium composite oxide having a large average particle size of more than 30 μm is used as a cathode active material, a Li diffusion length in the cathode active material is increased, and a part of Li fails to contribute to a charge/discharge reaction. In the cathode active material according to the first embodiment, the average particle size of the lithium composite oxide is not more than 30 μm. Therefore, the cathode active material according to the first embodiment prevents the capacity from being decreased even during the rapid charge/discharge and can realize high capacity.

In the cathode active material according to the first embodiment, the average particle size of the lithium composite oxide may be not less than 10 μm and not more than 30 μm.

If the average particle size of the lithium composite oxide is not less than 10 μm and not more than 30 μm, further increase in the capacity is achieved.

In the cathode active material according to the first embodiment, the average particle size of the lithium composite oxide may be not less than 15 μm and not more than 25 μm.

If the average particle size of the lithium composite oxide is not less than 15 μm and not more than 25 μm, the further increase in the capacity is realized.

In the cathode active material according to the first embodiment, the BET specific surface area of the lithium composite oxide is not less than 5 $m^2/g$ and not more than 10 $m^2/g$. By using the lithium composite oxide having such a high specific surface area as the cathode active material, the Li diffusion length is decreased in the cathode active material, and a contact area with the electrolyte liquid in the battery is increased. Therefore, it is conceivable that a battery suitable for the rapid charge/discharge can be realized.

In the cathode active material according to the first embodiment, the BET specific surface area of the lithium composite oxide may be not less than 7.5 $m^2/g$ and not more than 8.1 $m^2/g$.

If the BET specific surface area of the lithium composite oxide is not less than 7.5 $m^2/g$ and not more than 8.1 $m^2/g$, a high-capacity battery suitable for the rapid charge/discharge can be realized.

In the cathode active material according to the first embodiment, the average crystallite size of the lithium composite oxide is not less than 150 Å and not more than 350 Å.

Here, in the cathode active material according to the first embodiment, the crystallite size of the lithium composite oxide can be calculated by taking a peak reflecting the (003) plane as a representative in the XRD measurement and using a Scherrer's formula. In general, in a case of sintering an oxide, the higher the sintering temperature is, the narrower the width of the diffraction line is and the larger isotropically the crystallite size is.

The average crystallite size of the cathode active material according to the first embodiment is determined by performing an XRD measurement using five samples to determine the crystallite sizes of the lithium composite oxide, and calculating the average value thereof.

In the cathode active material according to the first embodiment, the lithium composite oxide has both a large particle size and a high specific surface area. It is conceivable that, in such a lithium composite oxide, in the case where the average crystallite size satisfies the above range, a battery having higher capacity and an excellent input/output characteristic can be realized. It is conceivable that, if the average crystallite size is too large, the Li diffusion length is made long and causes disadvantage in an increase in the capacity. On the other hand, if the average crystallite size is too small, the crystal of the cathode active material is not sufficiently grown, which causes disadvantage in the increase in the capacity. Since the average crystallite size satisfies not less than 150 Å and not more than 350 Å, the above problem which causes disadvantage in the increase in the capacity is less likely to occur. Therefore, a battery which has high capacity and is excellent in an input/output characteristic is realized.

Here, as a comparative example, for example, a cathode active material described in Patent Literature 1 will be examined. The cathode active material described in Patent Literature 1 has a core portion, a shell portion located around the core portion, and a buffer layer present in a gap between the core portion and the shell portion. Patent Literature 1 discloses, as the cathode active material, a lithium composite transition metal oxide characterized by that a BET specific surface area is not less than 0.1 $m^2/g$ and not more than 1.9 $m^2/g$, an average particle size (D50) is not less than 2 μm and not more than 20 μm, and an average crystallite size is not less than 50 nm and not more than 150 nm.

In other words, unlike the cathode electrode active material according to the first embodiment of the present disclosure, the lithium composite oxide described in Patent Literature 1 has neither a large particle size, which increases the density of the cathode active material, nor a high specific surface area, which allows the cathode active material to be excellent in the input/output characteristic. In other words, the cathode active material according to the first embodiment realizes a high-capacity battery by a configuration that cannot be easily reached from the conventional technology.

In addition, in the cathode active material according to the first embodiment, the lithium composite oxide includes, as the "cationic elements such as transition metals" other than lithium, at least one kind selected from the group consisting of, for example, Mn, Co, Ni, Fe, Cu, V, Nb, Mo, Ti, Cr, Zr, Zn, Na, K, Ca, Mg, Pt, Au, Ag, Ru, W, B, Si, P, and Al.

In addition, in the cathode active material according to the first embodiment, the lithium composite oxide may include, as the "cationic elements such as transition metals" other than lithium, at least one kind selected from the group consisting of, for example, Mn, Co, Ni, Fe, Cu, V, Ti, Cr, and Zn, namely, at least one kind selected from the group consisting of 3d transition metal element.

According to the above configuration, a higher capacity battery can be realized.

In addition, in the cathode active material according to the first embodiment, the lithium composite oxide may include, as the "cationic elements such as transition metals" other than lithium, at least one kind selected from the group consisting of, for example, Mn, Co, Ni, and Al.

According to the above configuration, a higher capacity battery can be realized.

In addition, in the cathode active material according to the first embodiment, the lithium composite oxide may include Mn.

According to the above configuration, Mn, which forms a hybrid orbital easily with oxygen, is included in the cathode active material, so that oxygen desorption during the charge is suppressed. In addition, the crystal structure is further stabilized in the crystal having the first phase and the second phase as described above. For this reason, it is conceivable that a larger amount of Li can be inserted and desorbed. Therefore, a higher capacity battery can be realized.

Next, an example of the chemical composition of the lithium composite oxide in the cathode active material according to the first embodiment will be described.

In the cathode active material according to the first embodiment, the average composition of the lithium composite oxide may be represented by the following composition formula (1).

$$Li_xMe_yO_\alpha Q_\beta \quad \text{Formula (1)}$$

Here, Me may be at least one kind selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P and Al.

In addition, Q may be at least one kind selected from the group consisting of F, Cl, N, and S.

The composition formula (1) may satisfy the following conditions:
 1.05≤x≤1.5;
 0.6≤y≤1.0;
 1.2≤α≤2.0; and
 0<β≤0.8.

According to the above configuration, a higher capacity battery can be realized.

In the first embodiment, in a case where Me consists of two or more elements (for example, Me' and Me") and the composition ratio is "Me'$_{y1}$Me"$_{y2}$", "y=y1+y2". For example, in a case where Me consists of two elements (e.g., Mn and Co) and the composition ratio is "Mn$_{0.6}$Co$_{0.2}$", "y=0.6+0.2=0.8". In addition, in a case where Q consists of two or more elements, calculation can be performed in the same manner as in the case of Me.

In the composition formula (1), in a case where x is not less than 1.05, an available Li amount is increased. Therefore, the capacity is improved.

In the composition formula (1), in a case where x is not more than 1.5, the available redox reaction of Me is increased. As a result, it is not necessary to use the redox reaction of oxygen so much. As a result, the crystal structure is stabilized. Therefore, the capacity is improved.

In the composition formula (1), when y is not less than 0.6, the available redox reaction of Me is increased. As a result, it is not necessary to use the reaction of oxygen so much. This stabilizes the crystal structure. Therefore, a capacity is improved.

In addition, in the composition formula (1), in a case where y is not more than 1.0, the available Li amount is increased. Therefore, the capacity is improved.

In addition, in the composition formula (1), in a case where α is not less than 1.2, it is possible to prevent a decrease in a charge compensation amount due to redox of oxygen. Therefore, the capacity is improved.

In addition, in the composition formula (1), in a case where α is not more than 2.0, it is possible to prevent an excessive capacity due to the oxygen redox. As a result, the structure when Li is desorbed is stabilized. Therefore, the capacity is improved.

In addition, in the composition formula (1), in a case where β is more than 0, the structure is stabilized due to the influence of electrochemically inactive Q when Li is desorbed. Therefore, the capacity is improved.

In addition, in the composition formula (1), in a case where β is not more than 0.8, the effect of electrochemically inactive Q can be prevented from being increased, so that the electron conductivity is improved. Therefore, the capacity is improved.

The "average composition" of the lithium composite oxide in the first embodiment is a composition provided by performing elemental analysis on the lithium composite oxide without considering the difference in the composition of each phase. Typically, it means a composition provided by performing an elemental analysis using a sample of the same size as or larger than the primary particles of the lithium composite oxide. In addition, the phases having different crystal structures from each other (for example, the first phase and the second phase) may have the same chemical composition or may have different chemical compositions.

The above average composition can be determined by an ICP emission spectroscopy, an inert gas melting-infrared absorption method, an ion chromatography, or a combination of these analysis methods.

In the composition formula (1), Me is at least one kind selected from the group consisting of Mn, Co, Ni, Fe, Cu, V, Ti, Cr, and Zn, namely, at least one kind of the 3d transition metal element.

According to the above configuration, a higher capacity battery can be realized.

In the composition formula (1), Me may include at least one selected from the group consisting of Mn, Co, Ni, and Al.

According to the above configuration, a higher capacity battery can be realized.

In the composition formula (1), Me may include Mn.

In other words, Me may be Mn.

Alternatively, Me may include Mn and at least one element selected from the group consisting of Co, Ni, Fe, Cu, V, Nb, Mo, Ti, Cr, Zr, Zn, Na, K, Ca, Mg, Pt, Au, Ag, Ru, W, B, Si, P, and Al.

According to the above configuration, Mn, which forms a hybrid orbital easily with oxygen, is included in the cathode active material, so that oxygen desorption during the charge is suppressed. In addition, the crystal structure is further stabilized in the crystal having the first phase and the second phase as described above. Therefore, a higher capacity battery can be realized.

In the composition formula (1), a ratio of Mn to Me may be not less than 59.9 mol %. In other words, the molar ratio of Mn to the entire Me including Mn (i.e., ratio of Mn/Me) may be not less than 0.599 and not more than 1.0.

According to the above configuration, a large amount of Mn, which forms a hybrid orbital easily with oxygen, is included in the cathode active material, so that oxygen desorption during the charge is further suppressed. In addition, the crystal structure is further stabilized in the crystal having the first phase and the second phase as described above. Therefore, a higher capacity battery can be realized.

In the composition formula (1), Me may include at least one selected from the group consisting of B, Si, P, and Al in a ratio of not more than 20 mol % with regard to Me.

According to the above configuration, the structure is stabilized by including an element having a high covalent character, so that the cycle characteristic is improved. Therefore, a battery having a longer life can be realized.

In addition, in the composition formula (1), Q may include F.

In other words, Q may be F.

Alternatively, Q may include F and at least one element selected from the group consisting of Cl, N, and S.

According to the above configuration, by replacing a part of oxygen with F, which has a high electronegativity, a cation-anion interaction is increased, and the discharge capacity or operating voltage of the battery is improved. In addition, by dissolving F, which has a high electronegativity, electrons are localized as compared with the case where F is not included. Therefore, the oxygen desorption during the charge can be suppressed, and the crystal structure is stabilized. In addition, the crystal structure is further stabilized in the crystal having the first phase and the second phase as described above. It is conceivable that a higher capacity battery can be realized by these effects acting comprehensively.

In addition, the composition formula (1) may satisfy the following conditions:

$1.166 \leq x \leq 1.4$; and
$0.67 \leq y \leq 1.0$.

According to the above configuration, a higher capacity battery can be realized.

In addition, the composition formula (1) may satisfy the following conditions:

$1.33 \leq \alpha \leq 1.917$; and
$0.083 \leq \beta \leq 0.67$.

According to the above configuration, it is possible to prevent the capacity from being excessive due to the redox of oxygen, and to be sufficiently affected by the electrochemically inactive Q, so that when Li is desorbed, the structure is stabilized. Therefore, a higher capacity battery can be realized.

In the composition formula (1), the ratio of "Li" to "Me" is represented by x/y.

The composition formula (1) may satisfy $1.39 \leq x/y \leq 2.0$.

According to the above configuration, a higher capacity battery can be realized.

If x/y is more than 1, for example, the ratio of the number of Li atoms at the site where Li is located is higher than that of the conventional cathode active material represented by the composition formula $LiMnO_2$. This allows a larger amount of Li to be inserted and desorbed.

In addition, if x/y is not less than 1.39, a large amount of Li can be used, and the Li diffusion path is appropriately formed. Therefore, a higher capacity battery can be realized.

In addition, if x/y is not more than 2.0, it is possible to prevent a decrease in the available redox reaction of Me. As a result, it is not necessary to use the redox reaction of oxygen so much. In addition, it is possible to prevent the crystal structure from being destabilized when Li is desorbed during the charge and to prevent the Li insertion efficiency during the discharge from decreased. Therefore, a higher capacity battery can be realized.

The composition formula (1) may satisfy $1.5 \leq x/y \leq 2.0$.

According to the above configuration, a higher capacity battery can be realized.

In the composition formula (1), the ratio of "O" to "Q" is represented by $\alpha/\beta$.

The composition formula (1) may satisfy $2 \leq \alpha/\beta \leq 23.1$.

According to the above configuration, a higher capacity battery can be realized.

When $\alpha/\beta$ is not less than 2, it is possible to prevent a decrease in the amount of the charge compensation due to the redox of oxygen. In addition, since the influence of electrochemically inactive Q can be decreased, electron conductivity is improved. Therefore, a higher capacity battery can be realized.

In addition, when $\alpha/\beta$ is not more than 23.1, it is possible to prevent the capacity from being excessive due to the redox of oxygen, and to stabilize the structure when Li is desorbed. In addition, due to the influence of electrochemically inactive Q, the structure is stabilized when Li is desorbed. Therefore, a higher capacity battery can be realized.

In the composition formula (1), the ratio between "Li+ Me" and "O+Q" (namely, the ratio of "cation" to "anion") is represented by $(x+y)/(\alpha+\beta)$.

The composition formula (1) may satisfy $0.75 \leq (x+y)/(\alpha+\beta) \leq 1.2$.

According to the above configuration, a higher capacity battery can be realized.

If $(x+y)/(\alpha+\beta)$ is not less than 0.75, it is possible to prevent a large amount of impurities from being generated due to phase separation during synthesis. Therefore, a higher capacity battery can be realized.

In addition, if $(x+y)/(\alpha+\beta)$ is not more than 1.2, the structure has a small amount of anion deficiencies, and the crystal structure is stabilized when Li is desorbed during the charge. Therefore, a higher capacity battery can be realized.

In addition, the composition formula (1) may satisfy $1.0 \leq (x+y)/(\alpha+\beta) \leq 1.2$.

According to the above configuration, a higher capacity battery can be realized.

In addition, in the cathode active material of the first embodiment, a part of Li in the lithium composite oxide may be replaced with an alkali metal such as Na or K.

In addition, the cathode active material according to the first embodiment may include the above-described lithium composite oxide as a main component (namely, in a mass ratio of not less than 50% with respect to the entire cathode active material (i.e., not less than 50% by mass)).

According to the above configuration, a higher capacity battery can be realized.

In addition, the cathode active material according to the first embodiment may include the above-described lithium composite oxide in a mass ratio of not less than 70% with respect to the entire cathode active material (i.e., not less than 70% by mass).

According to the above configuration, a higher capacity battery can be realized.

In addition, the cathode active material according to the first embodiment may include the above-described lithium composite oxide in a mass ratio of not less than 90% with respect to the entire cathode active material (i.e., not less than 90% by mass).

According to the above configuration, a higher capacity battery can be realized.

The cathode active material according to the first embodiment may further include unavoidable impurities in addition to the above-described lithium composite oxide.

In addition, the cathode active material according to the first embodiment may include at least one selected from the group consisting of source materials, by-products, and decomposition products used when synthesizing the cathode active material, in addition to the above-described lithium composite oxide.

In addition, the cathode active material according to the first embodiment may include, for example, only the above-described lithium composite oxide except for the unavoidable impurities.

According to the above configuration, a higher capacity battery can be realized.

<Production Method of Lithium Composite Oxide>

Hereinafter, an example of a method for producing the lithium composite oxide included in the cathode active material of the first embodiment will be described.

In the first embodiment, the lithium composite oxide may be produced, for example, by the following method.

First, a Me source material and a basic compound are mixed and coprecipitated at a pH of not less than 7 and not more than 8.5 to prepare a suspension including a Me-containing precursor seed crystal.

Next, in the above suspension, particles of the Me-containing precursor seed crystal are grown at pH of not less than 7 and not more than pH 8.5.

The particles of the grown Me-containing precursor seed crystal are mixed with a lithium source material and a Q source material, and then, heat-treated.

Examples of the Me source material which is used for preparing the suspension include compounds including Me, such as $MeSO_4$, $Me(NO_3)_2$, and $Me(CH_3COO)_2$.

Example of the basic compounds which is used for preparing the suspension include, for example, carbonates and hydrogencarbonates such as $Na_2CO_3$, $K_2CO_3$, $NaHCO_3$, and $KHCO_3$.

For example, a solution A including the Me source is prepared by dissolving the Me source material including Me in pure water so as to have a predetermined concentration (for example, 2 mol/L). In addition, a solution B including the basic compound is prepared by dissolving the basic compound in pure water to a predetermined concentration (for example, 2 mol/L). By dropping the two prepared solutions A and B into pure water while controlling the pH within a range of not less than 7 and not more than 8.5, the Me-containing precursor seed crystal as a precursor can be provided. In the suspension including the Me-containing precursor seed crystal, particles of the Me-containing precursor seed crystal are grown while controlling the pH within the range of not less than 7 and not more than 8.5.

Next, for producing the lithium composite oxide, a Li source material, particles of the above-mentioned Me-containing precursor seed crystal as a precursor, and the Q source material are prepared.

Examples of the Li source material include oxides such as $Li_2O$ and $Li_2O_2$, salts such as LiF, $Li_2CO_3$, and LiOH, and lithium composite oxides such as $LiMeO_2$ and $LiMe_2O_4$.

Examples of the Q source material include a lithium halide, a transition metal halide, a transition metal sulfide, and a transition metal nitride.

For example, if Q is F, examples of the F source material include LiF and a transition metal fluoride.

These source materials are weighed (i.e., prepared) so as to have the molar ratio shown in the composition formula (1). The weighed source materials are mixed by, for example, a dry method or a wet method, and then, heat-treated.

By performing these steps, the values of "x, y, α, and β" in the composition formula (1) can be varied within the range indicated by the composition formula (1).

The conditions of the heat treatment at this time are appropriately set so as to provide the lithium composite oxide in the first embodiment. The optimum conditions for the heat treatment differ, depending on other manufacturing conditions and the target composition.

The temperature of the heat treatment can be appropriately changed, for example, within the range of 200° C. to 900° C. The period required for the heat treatment can be appropriately changed, for example, within the range of 1 minute to 20 hours. The atmosphere for the heat treatment may be an air atmosphere, an oxygen atmosphere, or an inert atmosphere such as nitrogen or argon.

The heat treatment may be performed in two or more stages, for example.

For example, the temperature of the heat-treatment may be within a range of 600° C. to 750° C. For example, if the heat-treatment is performed with two stages, the temperature of the second stage heat-treatment may be within a range of 600° C. to 750° C. Since the heat-treatment is performed within such a temperature range, the lithium composite oxide having a BET specific surface area of not less than 5 $m^2/g$ and not more than 10 $m^2/g$ and an average particle size of not less than 3 μm and not more than 30 μm is easily synthesized.

As described above, by adjusting the source materials to be used, the mixing conditions of the mixture of the source material, and the heat treatment conditions, the lithium composite oxide substantially forming the cathode active material according to the first embodiment can be provided.

As described above, the space group of the crystal structure of the provided lithium composite oxide can be identified by, for example, an X-ray diffraction measurement or an electron diffraction measurement. In this way, for example, it can be confirmed that the provided lithium composite oxide has a crystal structure which belongs to the space group C2/m and R3-m.

The average composition of the provided lithium composite oxide can be determined, for example, by the ICP emission spectroscopy, the inert gas melting-infrared absorption method, the ion chromatography, or a combination of these analysis methods.

Second Embodiment

Hereinafter, the second embodiment will be described. The description which has been set forth in the above-described first embodiment will be appropriately omitted.

The battery in the second embodiment comprises the cathode including the cathode active material according to the first embodiment, an anode, and an electrolyte.

According to the above configuration, a high-capacity battery can be realized.

In addition, in the battery according to the second embodiment, the cathode may comprise a cathode active material layer. In this case, the cathode active material layer may include the cathode active material according to the above-described first embodiment as a main component (namely, in a mass ratio of not less than 50% with respect to the entire cathode active material layer (i.e., not less than 50% by mass)).

According to the above configuration, a higher capacity battery can be realized.

Alternatively, in the battery according to the second embodiment, the cathode active material layer may include the cathode active material according to the first embodiment in a mass ratio of not less than 70% with respect to the entire cathode active material layer (i.e., not less than 70% by mass)).

According to the above configuration, a higher capacity battery can be realized.

Alternatively, in the battery according to the second embodiment, the cathode active material layer may include the cathode active material according to the first embodiment in a mass ratio of not less than 90% with respect to the entire cathode active material layer (i.e., not less than 90% by mass)).

According to the above configuration, a higher capacity battery can be realized.

The battery according to the second embodiment can be configured as, for example, a lithium ion secondary battery, a non-aqueous electrolyte secondary battery, or an all-solid battery.

In other words, in the battery according to the second embodiment, the anode may include, for example, an anode active material capable of occluding and releasing lithium ions. Alternatively, the anode may include, for example, a material that can dissolve and precipitate a lithium metal as an anode active material.

In the battery according to the second embodiment, the electrolyte may be, for example, a non-aqueous electrolyte (for example, a non-aqueous electrolyte liquid).

In the battery according to the second embodiment, the electrolyte may be, for example, a solid electrolyte.

Figure 1:
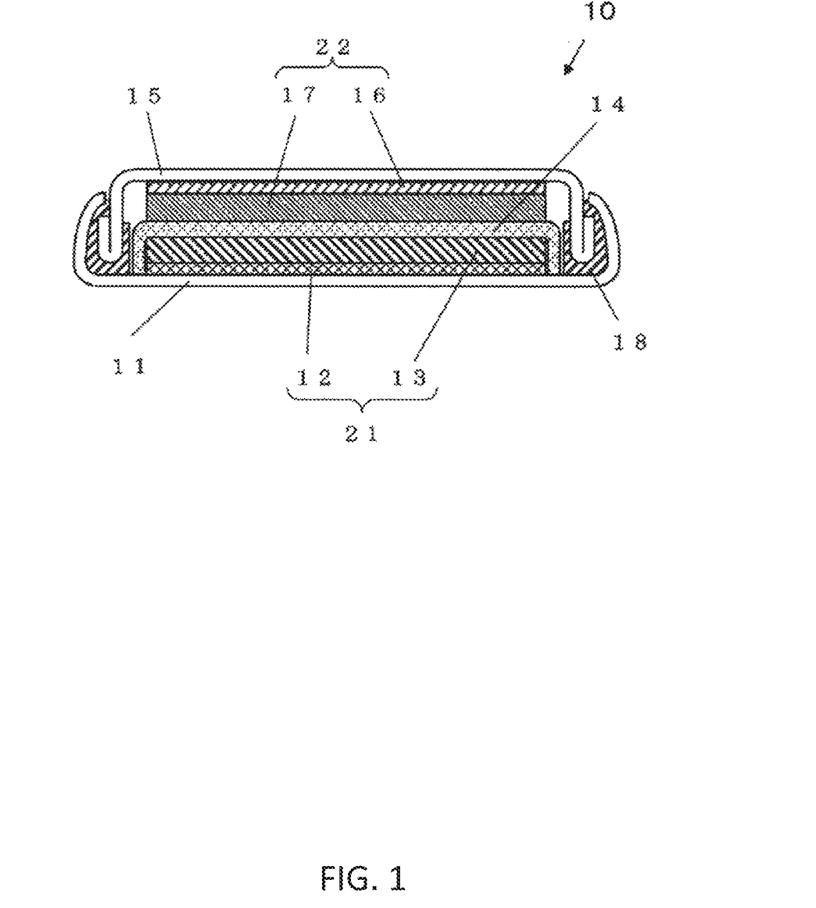
FIG. 1 is a cross-sectional view illustrating a schematic configuration of a battery 10 which is an example of a battery according to a second embodiment.

FIG. 1 is a cross-sectional view illustrating a schematic configuration of a battery 10 which is an example of the battery according to the second embodiment.

As shown in FIG. 1, the battery 10 comprises a cathode 21, an anode 22, a separator 14, a case 11, a sealing plate 15, and a gasket 18.

The separator 14 is disposed between the cathode 21 and the anode 22.

The cathode 21, the anode 22, and the separator 14 are impregnated with, for example, a non-aqueous electrolyte (for example, a non-aqueous electrolyte liquid).

An electrode group is formed of the cathode 21, the anode 22, and the separator 14.

The electrode group is stored in the case 11.

The case 11 is sealed with the gasket 18 and the sealing plate 15.

The cathode 21 comprises a cathode current collector 12 and a cathode active material layer 13 which has been disposed on the cathode current collector 12.

The cathode current collector 12 is formed of, for example, a metal material (for example, at least one kind selected from the group consisting of aluminum, stainless steel, nickel, iron, titanium, copper, palladium, gold, platinum, and an alloy thereof).

The cathode current collector 12 may be omitted, and the case 11 may be used as a cathode current collector.

The cathode active material layer 13 includes the cathode active material according to the first embodiment.

The cathode active material layer 13 may include, for example, an additive (e.g., a conductive agent, an ion conduction assistant agent, or a binder), if necessary.

The anode 22 comprises the anode current collector 16 and the anode active material layer 17 which has been disposed on the anode current collector 16.

The anode current collector 16 is formed of, for example, a metal material (for example, at least one selected from the group consisting of aluminum, stainless steel, nickel, iron, titanium, copper, palladium, gold, platinum, and an alloy thereof).

The anode current collector 16 may be omitted, and the sealing plate 15 may be used as the anode current collector.

The anode active material layer 17 includes an anode active material.

The anode active material layer 17 may include, for example, an additive (e.g., a conductive agent, an ionic conduction assistant agent, or a binder), if necessary.

As the anode active material, metal materials, carbon materials, oxides, nitrides, tin compounds, or silicon compounds can be used.

The metal material may be a single metal. Alternatively, the metal material may be an alloy. Examples of the metal materials include a lithium metal and a lithium alloy.

Examples of the carbon materials include natural graphite, coke, graphitized carbon, carbon fiber, spherical carbon, artificial graphite, and amorphous carbon.

From the viewpoint of capacity density, silicon (i.e., Si), tin (i.e., Sn), a silicon compound, and a tin compound can be used as the anode active material. The silicon compound and the tin compound may each be an alloy or a solid solution.

Examples of the silicon compound include $SiO_x$ (where $0.05<x<1.95$). In addition, a compound (e.g., alloy or solid solution) provided by substituting a part of silicon of $SiO_x$ with an element other than Si can also be used. Here, the element other than Si is at least one kind selected from the group consisting of boron, magnesium, nickel, titanium, molybdenum, cobalt, calcium, chromium, copper, iron, manganese, niobium, tantalum, vanadium, tungsten, zinc, carbon, nitrogen, and tin.

Examples of the tin compound include $Ni_2Sn_4$, $Mg_2Sn$, $SnO_x$ (where $0<x<2$), $SnO_2$, and $SnSiO_3$. One kind of the tin compound selected from these may be used alone. Alternatively, a combination of two or more kinds of the tin compounds selected from these may be used.

In addition, a shape of the anode active material is not particularly limited. As the anode active material, an anode active material having a known shape (e.g., particle shape, or fibrous shape) may be used.

The method for supplementing (i.e., occluding) lithium in the anode active material layer 17 is not particularly limited. Examples of the method include, specifically, (a) a method in which lithium is deposited on the anode active material layer 17 by a vapor phase method such as a vacuum evaporation method, and (b) a method in which lithium metal foil is brought into contact with the anode active material layer 17, and then, both the lithium metal foil and the anode active material layer 17 are heated. In either case, lithium can be diffused into the anode active material layer 17 by heat. There is also a method of electrochemically inserting lithium into the anode active material layer 17. Specifically, a battery is assembled using the lithium metal foil (i.e., cathode) and the anode 22 having no lithium. Subsequently, the battery is charged in such a manner that lithium is occluded in the anode 22.

Examples of the binder for the cathode 21 and the anode 22 include polyvinylidene fluoride, polytetrafluoroethylene, polyethylene, polypropylene, aramid resin, polyimide, polyimide, polyamideimide, polyacrylonitrile, polyacrylic acid, polymethylacrylate, polyethylacrylate, polyhexylacrylate, polymethacrylic acid, polymethyl methacrylate, polyethyl methacrylate, polyhexyl methacrylate, polyvinyl acetate, polyvinyl pyrrolidone, polyether, polyether sulfone, hexafluoro polypropylene, styrene butadiene rubber, and carboxymethyl cellulose. Alternatively, as the binder, a copolymer of two or more materials selected from the group consisting of tetrafluoroethylene, hexafluoroethane, hexafluoropropylene, perfluoroalkyl vinyl ether, vinylidene fluoride, chlorotrifluoroethylene, ethylene, propylene, pentafluoropropylene, fluoromethyl vinyl ether, acrylic acid, and hexadiene may be used. Furthermore, a mixture of two or more kinds of the materials selected from the above-mentioned materials may be used as the binder.

As the conductive agent of the cathode 21 and the anode 22, graphite, carbon black, conductive fiber, fluorinated graphite, metal powder, conductive whisker, conductive metal oxide, and organic conductive material can be used. Examples of the graphite include natural graphite and artificial graphite. Examples of the carbon black include acetylene black, ketjen black, channel black, furnace black, lamp black, and thermal black. Examples of the metal powder include aluminum powder. Examples of the conductive whisker include zinc oxide whiskers and potassium titanate whiskers. Examples of the conductive metal oxide include a titanium oxide. Examples of the organic conductive material include a phenylene derivative.

At least a part of the surface of the binder may be covered with a material that can be used as the conductive agent. For example, the above-mentioned binder may be coated on the surface with carbon black. In this way, the capacity of the battery can be improved.

A material of the separator 14 may be a material having high ion permeability and sufficient mechanical strength. Examples of such materials include microporous thin films, woven fabrics, and nonwoven fabrics. Specifically, the separator 14 is desirably formed of polyolefin such as polypropylene or polyethylene. The separator 14 formed of polyolefin has not only excellent durability but also can exhibit a shutdown function when excessively heated. The thickness of the separator 14 is, for example, within the range of 10 to 300 μm (or 10 to 40 μm). The separator 14 may be a single-layer film formed one kind of material. Alternatively, the separator 14 may be a composite film (or a multi-layer film) composed of two or more materials. The porosity of the separator 14 is within the range of, for example, 30 to 70% (or 35 to 60%). The "porosity" means a ratio of a volume of pores to the entire volume of the separator 14. The "porosity" is measured, for example, by a mercury intrusion method.

The non-aqueous electrolyte liquid includes a non-aqueous solvent and a lithium salt which has been dissolved in the non-aqueous solvent.

As the non-aqueous solvent, a cyclic carbonate ester solvent, a chain carbonate ester solvent, a cyclic ether solvent, a chain ether solvent, a cyclic ester solvent, a chain ester solvent, or a fluorine solvent may be used.

Examples of the cyclic carbonate ester solvent include ethylene carbonate, propylene carbonate, and butylene carbonate.

Examples of the chain carbonate ester solvent include dimethyl carbonate, ethyl methyl carbonate, and diethyl carbonate.

Examples of the cyclic ether solvent include tetrahydrofuran, 1,4-dioxane, and 1,3-dioxolan.

Examples of the chain ether solvent include 1,2-dimethoxyethane and 1,2-diethoxyethane.

Examples of the cyclic ester solvent include γ-butyrolactone.

Examples of the chain ester solvent include methyl acetate.

Examples of the fluorine solvent include fluoroethylene carbonate, methyl fluoropropionate, fluorobenzene, fluoroethyl methyl carbonate, and fluorodimethylene carbonate.

As the non-aqueous solvent, one kind of non-aqueous solvent selected from these may be used alone. Alternatively, a combination of two or more non-aqueous solvents selected from these may be used as the non-aqueous solvent.

The non-aqueous electrolyte liquid may include at least one kind of fluorine solvent selected from the group consisting of fluoroethylene carbonate, methyl fluoropropionate, fluorobenzene, fluoroethyl methyl carbonate, and fluorodimethylene carbonate.

If these fluorine solvents are included in the non-aqueous electrolyte liquid, the oxidation resistance of the non-aqueous electrolyte liquid is improved.

As a result, even when the battery 10 is charged with a high voltage, the battery 10 can be operated stably.

In the battery according to the second embodiment, the electrolyte may be a solid electrolyte.

As the solid electrolyte, an organic polymer solid electrolyte, an oxide solid electrolyte, or a sulfide solid electrolyte may be used.

As the organic polymer solid electrolyte, for example, a compound of a polymer compound and a lithium salt may be used.

The polymer compound may have an ethylene oxide structure. If the polymer compound has an ethylene oxide structure, a large amount of lithium salt can be included, and ionic conductivity can be further increased.

Examples of the oxide solid electrolyte include NASICON-type solid electrolytes such as $LiTi_2(PO_4)_3$ and its element-substituted substances, $(LaLi)TiO_3$-based perovskite-type solid electrolytes, LISICON-type solid electrolytes such as $Li_{14}ZnGe_4O_{16}$, $Li_4SiO_4$, $LiGeO_4$, and their element-substituted substances, garnet-type solid electrolytes such as $Li_7La_3Zr_2O_{12}$ and its element-substituted substances, $Li_3N$ and its H-substituted substances, and $Li_3PO_4$ and its N-substituted substances.

As the sulfide solid electrolyte, for example, $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, or $Li_{10}GeP_2S_{12}$ can be used. LiX (X: F, Cl, Br, I), $MO_y$, or $Li_xMO_y$ (M: any of P, Si, Ge, B, Al, Ga, or In) (x, y: natural numbers) may be added thereto.

Among these, sulfide solid electrolytes are particularly excellent in moldability and ionic conductivity. Therefore, by using a sulfide solid electrolyte as the solid electrolyte, a battery having a higher energy density can be realized.

Among sulfide solid electrolytes, $Li_2S$—$P_2S_5$ has high electrochemical stability and higher ionic conductivity. Therefore, if $Li_2S$—$P_2S_5$ is used as the solid electrolyte, a battery having higher energy density can be realized.

The solid electrolyte layer may include the above-described non-aqueous electrolyte liquid.

Since the solid electrolyte layer includes the non-aqueous electrolyte liquid, lithium ions can be easily exchanged between the active material and the solid electrolyte. As a result, a battery having a higher energy density can be realized.

The solid electrolyte layer may include a gel electrolyte or an ionic liquid in addition to the solid electrolyte.

The gel electrolyte may be a polymer material which has been impregnated with the non-aqueous electrolyte liquid. As the polymer material, polyethylene oxide, polyacrylonitrile, polyvinylidene fluoride, or polymethyl methacrylate may be used. As the polymer material, a polymer having an ethylene oxide bond may also be used.

Example of cations forming the ionic liquid include (i) aliphatic chain quaternary salts such as tetraalkylammonium or tetraalkylphosphonium, (ii) aliphatic cyclic ammoniums such as pyrrolidiniums, morpholiniums, imidazoliniums, tetrahydropyrimidiniums, piperaziniums or piperidiniums, and (iii) nitrogen-containing heterocyclic aromatic cations such as pyridiniums or imidazoliums. Example of the anions forming the ionic liquid includes $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. In addition, the ionic liquid may include a lithium salt.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. As the lithium salt, one lithium salt selected from these can be used alone. Alternatively, as the lithium salt, a mixture of two or more lithium salts selected from these can be used. The concentration of the lithium salt is, for example, within the range of 0.5 to 2 mol/L.

The batteries according to the second embodiment can be configured as batteries of various shapes such as a coin shape, a cylindrical shape, a prism shape, a sheet shape, a button shape, a flat shape, and a stacking structure shape.

EXAMPLES

Inventive Example

Inventive Example 1

[Production of Cathode Active Material]

$MnSO_4$, $NiSO_4$ and $CoSO_4$ were prepared at a molar ratio of Mn/Ni/Co=6.0/2.0/2.0 to provide source materials. The provided source materials were dissolved in pure water in such a manner that the concentration of (Mn+Ni+Co) was 2 mol/L to provide a solution including Mn, Ni, and Co (i.e., a solution including Me source materials). In addition, in another container, $KHCO_3$ was dissolved in pure water in such a manner that the concentration of $KHCO_3$ was 2 mol/L to provide a $KHCO_3$ solution.

Subsequently, pure water of 500 mL was prepared for a reaction container comprising an overflow pipe of 1 L. The solution including the Me source materials was dropped into the pure water at a rate of 0.7 mL/min and the $KHCO_3$ solution was dropped in such a manner that a pH thereof was maintained at 7.5. The temperature of the solution was maintained at 60° C., and the reaction between the Me source materials and the $KHCO_3$ was continued for 8 hours.

After the reaction, the solution left in the reaction container was collected. The collected solution was washed, filtered, and then, dried in a vacuum for 12 hours at 120° C. In this way, $MeCO_3$ was provided as a precursor of the cathode active material.

The thus-provided precursor, $Li_2CO_3$, and LiF were prepared at a molar ratio of Li/Mn/Co/Ni/O/F=1.166/0.5/0.167/0.167/1.917/0.083. In this way, a mixture was provided.

Subsequently, as a first stage heat-treatment, the provided mixture was heat-treated in an air atmosphere at 400° C. for ten hours.

Subsequently, as a second stage heat-treatment, the provided mixture was heat-treated in an air atmosphere at 700° C. for ten hours.

In this way, a lithium composite oxide was provided. The lithium composite oxide was used as the cathode active material of the inventive example 1.

The provided cathode active material was subjected to a powdery X-ray diffraction measurement. In this way, the crystal structure of the lithium composite oxide forming the cathode active material was analyzed.

The lithium composite oxide forming the provided cathode active material was a two-phase mixture of the first phase having the crystal structure which belonged to the space group C2/m and the second phase having the crystal structure which belonged to the space group R-3m.

The average composition of the lithium composite oxide of the inventive example 1 calculated from the molar ratio of the source materials is represented by $Li_{1.166}Mn_{0.5}Co_{0.167}Ni_{0.167}O_{1.917}F_{0.083}$, as shown in Table 1.

A BET specific surface area, an average particle size and an average crystallite size of the provided cathode active material (namely, the lithium composite oxide) were determined. The results are shown in Table 1. The method for measuring the BET specific surface area, the average particle size and the average crystallite size will be described below.

Figure 2:
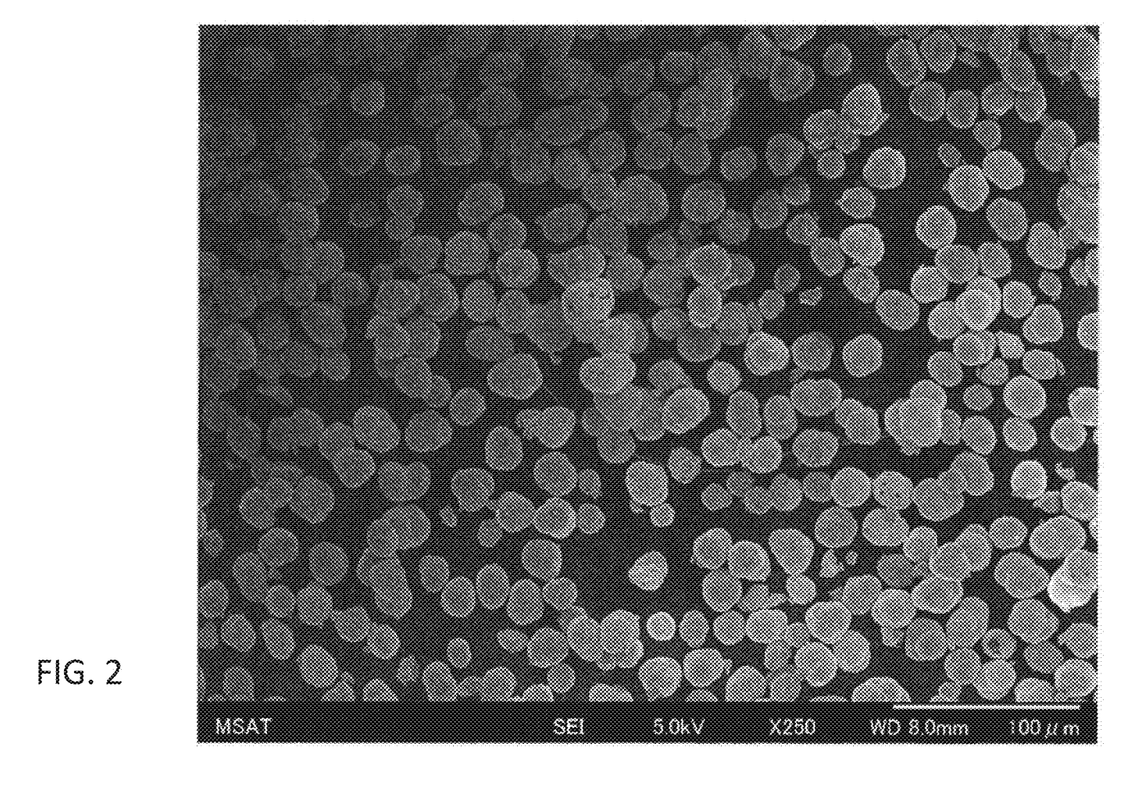
FIG. 2 is a scanning electron microscope (i.e., SEM) image of the cathode active material in the inventive example 1.

FIG. 2 is an SEM image of the cathode active material in inventive example 1.

(BET Specific Surface Area)

The BET specific surface area of the lithium composite oxide which was a provided cathode active material was measured. For the measurement, a nitrogen gas adsorption/desorption device (product of Yuasa Ionics, Inc., trade name: AUTOSORB-3) was used. The lithium composite oxide (50 mg) was prepared and sealed in a measurement cell. Subsequently, the lithium composite oxide was dried in a vacuum at 150° C. for 4 hours, and then, the measurement was performed while the measurement cell was cooled with liquid nitrogen.

(Average Particle Size)

An SEM image of the lithium composite oxide which was a provided cathode active material was acquired. For the measurement, an electron scanning microscope (product of JEOL Ltd., trade name: JSM-6700F) was used. Using this SEM image, the particle size of 100 particles of the lithium composite oxide was measured. The average value of the particle size was calculated by the result of the measurement.

(Average Crystallite Size)

A crystallite size of the lithium composite oxide which was a provided cathode active material was measured. For the measurement, an X-ray diffraction device (product of Rigaku Corporation, trade name: MiniFlex) was used. The measurement of the crystallite size was performed in five points, and the average value thereof was used as "average crystallite size".

[Production of Battery]

The above-described cathode active material (70 parts by mass) were mixed with a conductive agent (20 parts by mass), polyvinylidene fluoride (i.e., PVDF, 10 parts by mass), and an appropriate amount of 2-methylpyrrolidon (i.e., NMP). In this way, a cathode mixture slurry was provided.

The cathode mixture slurry was applied to one surface of a cathode current collector formed of aluminum foil having a thickness of 20 μm.

The cathode mixture slurry was dried and pressed with a roller to provide a cathode plate which comprised a cathode active material layer and having a thickness of 60 μm.

The provided cathode plate was punched and cut to provide a cathode having a diameter of 12.5 mm and a shape of a circle.

In addition, lithium metal foil having a thickness of 300 μm was punched and cut to provide an anode having a diameter of 14.0 mm and a shape of a circle.

In addition, a non-aqueous solvent was provided by mixing fluoroethylene carbonate (i.e., FEC), ethylene carbonate (i.e., EC), and ethyl methyl carbonate (i.e., EMC) at a volume ratio of 1:1:6.

$LiPF_6$ was dissolved in the non-aqueous solvent at a concentration of 1.0 mol/L to provide a non-aqueous electrolyte liquid.

A separator (product of Celgard, product number: 2320, thickness 25 μm) was impregnated with the provided non-aqueous electrolyte liquid. The separator was a three-layer separator formed of a polypropylene layer, a polyethylene layer, and a polypropylene layer.

Using the above-described cathode, anode, and separator, a coin-shaped battery in accordance with a standard of CR2032 was produced in a dry box in which a dew point was maintained at −50° C.

Inventive Examples 2 and 3

The lithium composite oxides each having the same average composition as that of the inventive example 1 were provided by a method similar to the inventive example 1, except that the heat temperature of the second stage was the heat temperature shown in Table 1. The provided lithium composite oxides were used as the cathode active materials in the inventive examples 2 and 3.

The provided cathode active materials were subjected to the powder X-ray diffraction measurement. In this way, the crystal structure of each of the lithium composite oxides forming the cathode active materials was analyzed. As a result, the lithium composite oxides forming the cathode active materials of the inventive examples 2 and 3 were two-phase mixture of the first phase having a crystal structure which belonged to the space group C2/m and the second phase having a crystal structure which belonged to the space group R-3m.

Similarly to the inventive example 1, the BET specific surface area, the average particle size, and the average crystallite size of each of the provided cathode active materials (namely, the lithium composite oxides) were measured. The results are shown in Table 1.

The coin-shaped batteries of the inventive examples 2 and 3 were produced using the provided cathode active materials, similarly to the inventive example 1.

Comparative Example 1

A cathode active material having a composition represented by $LiCoO_2$ was provided by a known procedure using a solid phase method of sintering a mixture of lithium carbonate and cobalt oxide.

The provided cathode active materials were subjected to the powder X-ray diffraction measurement. In this way, the crystal structure of the lithium composite oxide forming the cathode active material according to the comparative example 1 was analyzed. As a result, the lithium composite oxide forming the cathode active material of the comparative example 1 was a single phase having only a crystal structure which belonged to the space group R-3m.

The average particle size of the provided cathode active material (namely, the lithium composite oxide) was determined in the same manner as in the inventive example 1. The result is shown in Table 1.

A coin-shaped battery of the comparative example 1 was produced in the same manner as in the inventive example 1 using the provided cathode active material.

Comparative Example 2

A hydroxide precursor having a composition represented by $Mn_{0.357}Co_{0.143}Ni_{0.143}OH_2$ was synthesized by a known coprecipitation method. Next, the provided precursor was subjected to a heat treatment under the same heating conditions as in the inventive example 1 to synthesize a lithium composite oxide having an average composition similar to that of the inventive example 1. The lithium composite oxide was used as a cathode active material of the comparative example 2.

The provided cathode active materials were subjected to the powder X-ray diffraction measurement. In this way, the crystal structure of the lithium composite oxide forming the cathode active material was analyzed. As a result, the lithium composite oxide forming the cathode active material of the comparative example 2 was a two-phase mixture of the first phase having the crystal structure which belonged to the space group C2/m and the second phase having the crystal structure which belonged to the space group R-3m.

Similarly to the inventive example 1, the BET specific surface area, the average particle size, and the average crystallite size of each of the provided cathode active materials (namely, the lithium composite oxides) were measured. The results are shown in Table 1.

A coin-shaped battery of the comparative example 2 was produced in the same manner as in the inventive example 1 using the provided cathode active material.

Comparative Examples 3 to 6

In the comparative examples 3 to 6, the heat temperature of the second stage heat-treatment was changed. Specifically, the lithium composite oxides of the comparative examples 3 to 6 were synthesized similarly to the case of the inventive example 1, except that the heat temperature was adjusted in the range of 300 to 1,000° C. Table 1 shows the heat temperature of the second stage heat-treatment of the comparative examples 3 to 6.

The provided cathode active materials were subjected to the powder X-ray diffraction measurement. In this way, the crystal structures of the lithium composite oxides forming the cathode active materials of the comparative examples 3 to 6 were analyzed. As a result, the lithium composite oxides forming the cathode active materials of the comparative examples 3 to 6 were two-phase mixtures of the first phase having the crystal structure which belonged to the space group C2/m and the second phase having the crystal structure which belonged to the space group R-3m.

Similarly to the inventive example 1, the BET specific surface area, the average particle size, and the average crystallite size of each of the provided cathode active materials (namely, the lithium composite oxides) of the comparative examples 3 to 6 were measured. The results are shown in Table 1.

A coin-shaped batteries of the comparative examples 3 to 6 were produced in the same manner as in the inventive example 1 using the provided cathode active materials.

<Evaluation of Batteries>

A current density with respect to the cathode was set to 0.5 mA/cm$^2$, and the battery of the inventive example 1 was charged until the voltage thereof reached 4.7 V.

Subsequently, the discharge cutoff voltage was set to 2.5 V, and the battery of the inventive example 1 was discharged at a current density of 0.5 mA/cm$^2$.

The initial discharge capacity of the battery of the inventive example 1 was 274 mAh/g.

The initial discharge capacity of each of the batteries of the inventive examples 2 and 3 and the comparative examples 2 to 6 was measured by a similar method to that of the inventive example 1. Table 1 shows the initial discharge capacity of each of the batteries of the inventive examples 2 and 3 and the comparative examples 2 to 6.

The battery of the comparative example 1 was evaluated as below.

A current density with respect to the cathode was set to 0.5 mA/cm$^2$, and the battery of the comparative example 1 was charged until the voltage thereof reached 4.3 V.

Subsequently, the discharge cutoff voltage was set to 2.5 V, and the battery of the comparative example 1 was discharged at a current density of 0.5 mA/cm$^2$.

The initial discharge capacity of the battery of the comparative example 1 was 150 mAh/g.

Table 1 shows the above results.

TABLE 1

| Average composition | Heat temp. (° C.) | BET specific surface area (m$^2$/g) | Average particle size (μm) | Crystallite size (Å) | Initial discharge capacity (mAh/g) |
| --- | --- | --- | --- | --- | --- |
| I.E. 1 Li$_{1.166}$Mn$_{0.5}$Co$_{0.167}$Ni$_{0.167}$O$_{1.917}$F$_{0.083}$ | 700 | 8 | 17 | 289 | 274 |
| I.E. 2 Li$_{1.166}$Mn$_{0.5}$Co$_{0.167}$Ni$_{0.167}$O$_{1.917}$F$_{0.083}$ | 650 | 8.1 | 17 | 221 | 240 |
| I.E. 3 Li$_{1.166}$Mn$_{0.5}$Co$_{0.167}$Ni$_{0.167}$O$_{1.917}$F$_{0.083}$ | 750 | 7.5 | 16 | 320 | 271 |
| C.E. 1 LiCoO$_2$ | — | — | 2.3 | — | 150 |
| C.E. 2 Li$_{1.166}$Mn$_{0.5}$Co$_{0.167}$Ni$_{0.167}$O$_{1.917}$F$_{0.083}$ | 700 | 3.5 | 19 | 267 | 221 |
| C.E. 3 Li$_{1.166}$Mn$_{0.5}$Co$_{0.167}$Ni$_{0.167}$O$_{1.917}$F$_{0.083}$ | 300 | 140 | 20 | 82 | 104 |
| C.E. 4 Li$_{1.166}$Mn$_{0.5}$Co$_{0.167}$Ni$_{0.167}$O$_{1.917}$F$_{0.083}$ | 500 | 14 | 24 | 141 | 198 |
| C.E. 5 Li$_{1.166}$Mn$_{0.5}$Co$_{0.167}$Ni$_{0.167}$O$_{1.917}$F$_{0.083}$ | 900 | 4 | 14 | 522 | 99 |
| C.E. 6 Li$_{1.166}$Mn$_{0.5}$Co$_{0.167}$Ni$_{0.167}$O$_{1.917}$F$_{0.083}$ | 1000 | 2 | 10 | 701 | 51 |

I.E. means Inventive Example.
C.E. means Comparative Example.

As shown in Table 1, the batteries of the inventive examples 1 to 3 had an initial discharge capacity of 240 to 274 mAh/g. The initial discharge capacity of the battery of inventive example 1 was the highest among these. On the other hand, the batteries of the comparative examples 1 to 6 had an initial discharge capacity of 51 to 221 mAh/g. In this way, the batteries of the inventive examples 1 to 3 had a higher initial discharge capacity than the batteries of the comparative examples 1 to 6.

It is conceivable that the reason therefor is that the BET specific surface area satisfies the range of not less than 5 m$^2$/g and not more than 10 m$^2$/g and that the average particle size satisfies the range of not less than 3 μm and not more than 30 μm in the lithium composite oxide forming the cathode active material according to the inventive examples 1 to 3. Furthermore, in the lithium composite oxide forming the cathode active material according to the inventive examples 1 to 3, the average crystallite size satisfies the range of not less than 150 Å and not more than 350 Å.

As described above, the large BET specific surface area and the large average particle size are satisfied in the lithium composite oxide forming the cathode active material according to the inventive examples 1 to 3. It is conceivable that, if the lithium composite oxide having a large BET specific surface area is used as the cathode active material, the Li diffusion length is shortened, which contributes advantageously to the increase in the capacity. In addition, it is conceivable that, if the lithium composite oxide having a large average particle size is used as the cathode active material, the density of the cathode active material is increased, which realizes the increase in the capacity. It is conceivable that, in the lithium composite oxide of the inventive examples 1 to 3, since both the large BET specific surface area and the large average particle size were realized, the increase in the capacity was achieved.

Although each of the lithium composite oxides forming the cathode active materials in the comparative examples 2, 5, and 6 had a large average particle size, each of the lithium composite oxides forming the cathode active materials in the comparative examples 2, 5, and 6 had a small BET specific surface area. As a result, it is conceivable that, in the cathode active materials in the comparative examples 2, 5, and 6, the Li diffusion length was long, which causes difficulty of the increase in the capacity.

Each of the lithium composite oxides forming the cathode active materials in the comparative examples 3 and 4 had an average particle size of not less than 3 μm and not more than 30 μm and a large BET specific surface area. However, it is conceivable that, for the actual production of the battery, the BET specific surface area which is too large value of more than 10 m$^2$/g causes disadvantage in view of the increase in the density of the cathode active material. As a result, it is conceivable that the increase in the capacity of the batteries of the comparative examples 3 to 4 was made difficult, and each of the batteries of the comparative examples 3 to 4 had a smaller initial discharge capacity than the battery of the inventive example 1.

The lithium composite oxide forming the cathode active material in the comparative examples 1 had a small average particle size of less than 3 μm. As a result, it is conceivable that, in the battery of the comparative example 1, the density of the cathode active material failed to be increased, and that the initial discharge capacity was significantly decreased.

In addition, it is conceivable that, if the average crystallite size is too large, the Li diffusion length is made long, which causes disadvantage in view of the increase in the capacity. On the other hand, it is conceivable that, if the average crystallite size is too small, the crystal of the cathode active material is not grown sufficiently, which causes disadvantage in view of the increase in the capacity. It is conceivable that the average crystallite size within the range of not less than 150 Å and not more than 350 Å realizes the increase in the capacity. The average crystallite size of the lithium composite oxide of the inventive example 1 satisfies the range of not less than 150 Å and not more than 350 Å.

Therefore, it is conceivable that the battery of the inventive example 1 has realized the further increase in the capacity.

INDUSTRIAL APPLICABILITY

The cathode active material of the present disclosure can be used as a cathode active material of a battery such as a secondary battery.

REFERENCE SIGNS LIST

10 Battery
11 Case
12 Cathode current collector
13 Cathode active material layer
14 Separator
15 Sealing plate
16 Anode current collector
17 Anode active material layer
18 Gasket
21 Cathode
22 Anode

The invention claimed is:

1. A cathode active material comprising:
a lithium composite oxide having a crystal structure which belongs to a layered structure, wherein:
the lithium composite oxide has a BET specific surface area of not less than 5 m²/g and not more than 10 m²/g,
the lithium composite oxide has an average particle size of not less than 3 μm and not more than 30 μm,
in the lithium composite oxide, an average crystallite size calculated by an X-ray diffraction method is not less than 150 Å and not more than 350 Å, and
the lithium composite oxide includes at least one selected from the group consisting of F, Cl, N, and S.

2. The cathode active material according to claim 1, wherein
the lithium composite oxide has an average particle size of not less than 10 μm and not more than 30 μm.

3. The cathode active material according to claim 1, wherein
the lithium composite oxide has a BET specific surface area of not less than 7.5 m²/g and not more than 8.1 m²/g.

4. The cathode active material according to claim 1, wherein
the lithium composite oxide includes Mn.

5. The cathode active material according to claim 1, wherein
the lithium composite oxide includes F.

6. The cathode active material according to claim 1, wherein
an average composition of the lithium composite oxide is represented by the following composition formula (1):

Formula (1)

$$Li_xMe_yO_\alpha Q_\beta$$

where,
Me is at least one selected from the group consisting of Mn, Co, Ni, Fe, Cu, V, Nb, Mo, Ti, Cr, Zr, Zn, Na, K, Ca, Mg, Pt, Au, Ag, Ru, W, B, Si, P, and Al;
Q is at least one selected from the group consisting of F, Cl, N, and S; and
the composition formula (1) satisfies the following conditions:
$1.05 \le x \le 1.5$;
$0.6 \le y \le 1.0$;
$1.2 \le \alpha \le 2.0$; and
$0 < \beta \le 0.8$.

7. The cathode active material according to claim 6, wherein
Me includes at least one selected from the group consisting of Mn, Co, Ni, Fe, Cu, V, Ti, Cr, and Zn.

8. The cathode active material according to claim 7, wherein
Me includes at least one selected from the group consisting of Mn, Co, Ni, and Al.

9. The cathode active material according to claim 8, wherein
Me includes Mn.

10. The cathode active material according to claim 9, wherein
a ratio of Mn to Me is not less than 59.9 mol %.

11. The cathode active material according to claim 6, wherein
Q includes F.

12. The cathode active material according to claim 1, wherein
the cathode active material includes the lithium composite oxide as a main component.

13. The cathode active material according to claim 1, wherein
the lithium composite oxide is a multi-phase mixture including a first phase having a crystal structure which belongs to a space group C2/m and a second phase having a crystal structure which belongs to a space group R-3m.

14. The cathode active material according to claim 13, wherein
the lithium composite oxide is a two-phase mixture of the first phase and the second phase.

15. A battery, comprising:
a cathode including a cathode active material according to claim 1;
an anode; and
an electrolyte.

16. The battery according to claim 15, wherein
the anode includes at least one selected from the group consisting of (i) an anode active material capable of occluding and releasing lithium ions and (ii) a material from which a metal lithium is dissolved into the electrolyte during discharge and onto which the metal lithium is deposited during charge; and
the electrolyte is a non-aqueous electrolyte liquid.

17. The battery according to claim 15, wherein
the anode includes at least one selected from the group consisting of (i) an anode active material capable of occluding and releasing lithium ions and (ii) a material from which a metal lithium is dissolved into the electrolyte during discharge and onto which the metal lithium is deposited during charge; and
the electrolyte is a solid electrolyte.

* * * * *